Dec. 6, 1938.  N. DUPUIS  2,138,843

SPRING LOCK BOLT

Filed Nov. 16, 1937

Noel Dupuis
INVENTOR.

BY C. A. Snow & Co.

ATTORNEYS.

Patented Dec. 6, 1938

2,138,843

UNITED STATES PATENT OFFICE 2,138,843

SPRING LOCK BOLT

Noël Dupuis, Seattle, Wash.

Application November 16, 1937, Serial No. 174,873

1 Claim. (Cl. 292—352)

This invention aims to provide a simple but effective means for attaching a door knob to a shaft, without resorting to the usual screw employed for connecting those parts.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
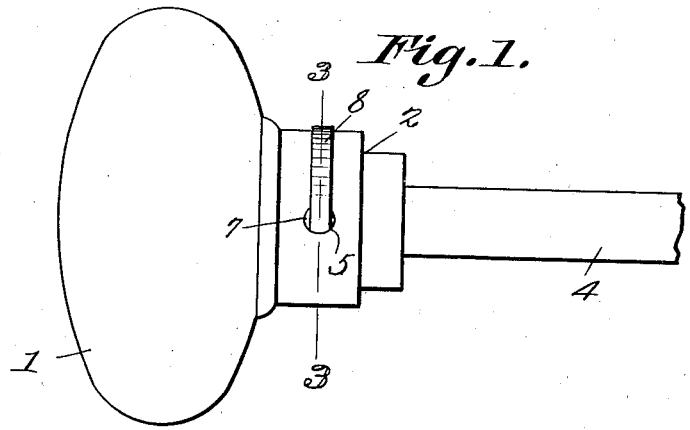
Fig. 1 shows in top plan, a device constructed in accordance with the invention.
Figure 2:
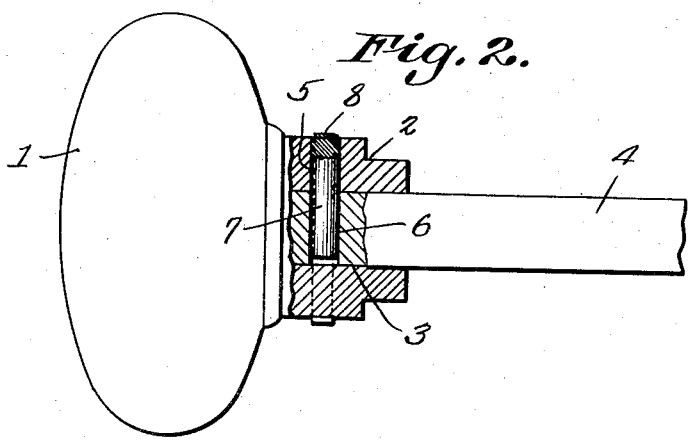
Fig. 2 is a side elevation wherein parts are sectioned away.

The numeral 1 marks a door knob having a shank 2 provided with a bore 3 for the reception of one end of a shaft 4. The shank 2 is supplied with a transverse guideway 5 aligned axially with a transverse seat 6 extended, preferably, entirely through the shaft 4.

Figure 3:
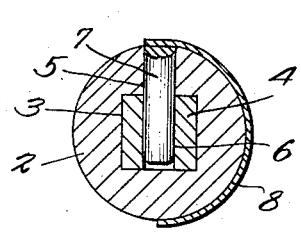
Fig. 3 is a transverse section on the line 3—3 of Fig. 1.

In the guideway 5 and in the seat 6 is mounted a smooth, cylindrical, freely slidable holding pin 7. To the outer end of the pin 7, a curved gripping spring 8 is secured. The spring 8 extends far enough around the shank 2 to hold the pin 7 in place, as shown in Fig. 3.

Because the seat 6 extends entirely through the shaft 4, the pin 7 may be engaged in the seat on opposite sides of the shaft 4.

The pin 7 terminates within the seat 6. The pin, therefore, is shortened, and the pin may be inserted into the guideway 5 and into the seat 6 with a minimum amount of flexing in the spring 8.

Figure 4:
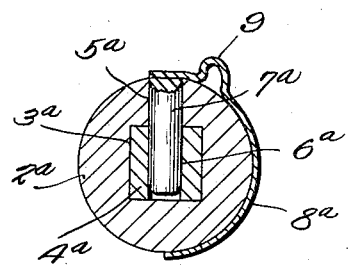
Fig. 4 is a transverse section similar to Fig. 3 but showing a modification.

In Fig. 4, parts hereinbefore described have been designated by numerals already used, with the suffix "a". The form shown in Fig. 4 is characterized by the fact that the spring 8a has an outwardly projecting bend 9, located close to the pin 7a and enhancing the resiliency of the spring, most of the bending of the spring, when the pin 7a is inserted into the guideway 5a and into the seat 6a, taking place close to the pin 7a. The bend 9, moreover, tends to prevent the end of the spring 8a from being broken loose from the end of the pin 7a. If desired, the operator can close the bend 9, with a pair of pliers or the like, as much as is desired, in order to enhance the grip of the spring 8a on the shank 2a.

The device is simple in construction, in either of its forms, and does away with the screw commonly employed to connect the shank of the door knob to the shaft. Moreover, it is unnecessary to thread either the guideway 5 or the seat 6.

Having thus described the invention, what is claimed is:

In a device of the class described, a door knob including a shank having a longitudinal bore and provided with a transverse guideway, a shaft inserted into the bore and having a transverse seat aligned with the guideway, a locking pin mounted in the guideway and in the seat and longitudinally slidable therein, and a curved spring secured at one end to the outer end of the pin and extended far enough around the shank to hold the pin in place, the spring having an outwardly projecting bend located close to the pin and enhancing the resiliency of the spring, the bend being capable of being closed together to such a degree as to enhance the grip of the spring on the shank.

NOËL DUPUIS.